US008994861B2

(12) United States Patent
Kobayashi

(10) Patent No.: US 8,994,861 B2
(45) Date of Patent: Mar. 31, 2015

(54) IMAGING APPARATUS AND IMAGING METHOD FOR OBTAINING PLURAL KINDS OF IMAGE DATA WITH DIFFERENT DYNAMIC RANGES IN A SINGLE PHOTOGRAPHING

(71) Applicant: FUJIFILM Corporation, Minato-ku, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/750,467

(22) Filed: Jan. 25, 2013

(65) Prior Publication Data

US 2013/0135506 A1 May 30, 2013

Related U.S. Application Data

(63) Continuation of application No. PCT/JP2011/061558, filed on May 19, 2011.

(30) Foreign Application Priority Data

Jul. 28, 2010 (JP) .................................. 2010-169799

(51) Int. Cl.
*H04N 3/14* (2006.01)
*H04N 5/335* (2011.01)
(Continued)

(52) U.S. Cl.
CPC ........... *H04N 5/335* (2013.01); *H04N 5/35554* (2013.01); *H04N 2101/00* (2013.01)
USPC ......... 348/294; 348/362; 348/298; 348/222.1

(58) Field of Classification Search
CPC .............. H04N 5/35554; H04N 5/335; H04N 2101/00; H04N 5/2355; H04N 5/2356; H04N 5/23229; H04N 5/235; H04N 5/222; H04N 19/00981; H04N 5/232; H04N 9/00; H04N 1/3871; G06T 5/00; G06T 5/007; G06T 5/009; G06T 2207/20208

USPC ................ 348/294–324, 239, 241, 362–368, 348/222.1
See application file for complete search history.

(56) References Cited

U.S. PATENT DOCUMENTS 7,724,301 B2 * 5/2010 Alakarhu ...................... 348/362
2006/0202038 A1 * 9/2006 Wang et al. ............... 235/462.24
(Continued)

FOREIGN PATENT DOCUMENTS

JP 2007-214832 A 8/2007
JP 2008-147818 A 6/2008
(Continued)

OTHER PUBLICATIONS

International Search Report (PCT/ISA/210), dated Jun. 14, 2011, issued by the International Searching Authority in corresponding International Application No. PCT/JP2011/061558.
(Continued)

*Primary Examiner* — Pritham Prabhakher
(74) *Attorney, Agent, or Firm* — Sughrue Mion, PLLC

(57) ABSTRACT

An imaging apparatus having a solid state imaging device that includes first photoelectric conversion elements and second photoelectric conversion elements arranged in a two dimensional array, comprises a device control unit that performs a driving in which a first signal according to electrical charges accumulated in the first photoelectric conversion elements during a first exposure period and a second signal according to electrical charges accumulated in the second photoelectric conversion elements during each of second exposure periods are read by sequentially exposing the second photoelectric conversion elements for the second exposure periods, each of which overlaps with the first exposure period and has different length of time, during periods overlapped with the first exposure period while simultaneously exposing the first photoelectric conversion elements for the first exposure period.

8 Claims, 9 Drawing Sheets

(51) Int. Cl.
*G03B 7/00* (2014.01)
*H04N 5/235* (2006.01)
*H04N 5/228* (2006.01)
*H04N 5/355* (2011.01)
*H04N 101/00* (2006.01)

(56) References Cited

U.S. PATENT DOCUMENTS

| | | | |
|---|---|---|---|
| 2007/0230939 A1* | 10/2007 | Tanaka et al. | 396/155 |
| 2007/0273785 A1 | 11/2007 | Ogawa et al. | |
| 2008/0122969 A1* | 5/2008 | Alakarhu | 348/362 |
| 2008/0173794 A1 | 7/2008 | Oike et al. | |
| 2008/0239126 A1* | 10/2008 | Wakamori | 348/308 |
| 2009/0219425 A1* | 9/2009 | Kobayashi et al. | 348/306 |
| 2009/0244350 A1 | 10/2009 | Wada | |
| 2009/0251584 A1* | 10/2009 | Alakarhu | 348/333.01 |
| 2009/0295959 A1 | 12/2009 | Shoho et al. | |
| 2010/0053346 A1 | 3/2010 | Mitsunaga | |
| 2010/0066878 A1 | 3/2010 | Mabuchi | |
| 2010/0123821 A1* | 5/2010 | Gwak et al. | 348/371 |
| 2010/0128159 A1 | 5/2010 | Yamashita | |
| 2011/0069205 A1* | 3/2011 | Kasai et al. | 348/239 |

FOREIGN PATENT DOCUMENTS

| | | |
|---|---|---|
| JP | 2009-268073 A | 11/2009 |
| JP | 2009-290613 A | 12/2009 |
| JP | 2009-302653 A | 12/2009 |
| JP | 2010-62785 A | 3/2010 |
| JP | 2010-130343 A | 6/2010 |
| WO | 2006/049098 A1 | 5/2006 |

OTHER PUBLICATIONS

Written Opinion (PCT/ISA/237), dated Jun. 14, 2011, issued by the International Searching Authority in corresponding International Application No. PCT/JP2011/061558.

* cited by examiner

IMAGING APPARATUS AND IMAGING METHOD FOR OBTAINING PLURAL KINDS OF IMAGE DATA WITH DIFFERENT DYNAMIC RANGES IN A SINGLE PHOTOGRAPHING

TECHNICAL FIELD

The present invention relates to an imaging apparatus and an imaging method.

BACKGROUND ART

CCD (Charge Coupled Device) type solid state imaging devices or CMOS (Complementary Metal Oxide Semiconductor) type solid state imaging devices are distributed as solid state imaging devices for imaging a subject. A dynamic range of the solid state imaging devices for an incident light is being gradually enhanced by the improvement of semiconductor technologies. However, it is not so uncommon that an incident light exceeding a preset dynamic range is generated in a situation where a solid state imaging device is actually utilized. Therefore, a technology for extending a dynamic range is being actively investigated.

For example, Patent Document 1 discloses an imaging apparatus provided with a solid state imaging device, in which the solid state imaging device includes a pixel that performs long-term exposure, and a pixel that starts short-term exposure during a period where the long-term exposure is being performed. The imaging apparatus combines an image obtained with the long-term exposure and an image obtained with the short-term exposure to extend a dynamic range.

Further, Patent Document 2 discloses an imaging apparatus provided with a solid state imaging device in which pixels that perform long-term exposure and pixels that perform short-term exposure multiple times and conduct outputting each time the short-term exposure is performed. The pixels are arranged in a grid pattern. The imaging apparatus averages a plurality of images obtained with the short-term exposure to correct camera shake. The imaging apparatus combines an image after averaging and an image obtained with the long-term exposure to extend a dynamic range.

It is necessary for the imaging apparatuses to perform photographing several times while changing a ratio of the long-term exposure and the short-term exposure in order to obtain plural kinds of image data having different dynamic ranges for the same subject. However, a photographing environment changes every moment. For example, the subject may move or the sun may disappear behind the clouds between photographings. Therefore, it is not easy to obtain image data having different dynamic ranges for the same subject.

After the photographing is ended, when an image data with a desired dynamic range extension ratio can be generated, it becomes possible to obtain an expected image. However, until now, an imaging apparatus with such a function is not present.

CITATION LIST

Patent Literature

[Patent Document 1] JP-A-2009-302653
[Patent Document 2] JP-A-2010-062785

SUMMARY OF INVENTION

Technical Problem

The present invention has been made in an effort to solve the problems described above and an object of the present invention is to provide an imaging apparatus and an imaging method capable of obtaining plural kinds of image data having different dynamic ranges with a single photographing.

Solution to Problem

An imaging apparatus of the present invention includes: a solid state imaging device that includes a plurality of first photoelectric conversion elements and a plurality of second photoelectric conversion elements arranged in a two-dimensional array; and a driving unit that performs a driving in which a first signal according to electrical charges accumulated in the plurality of first photoelectric conversion elements during the first exposure period and a second signal according to electrical charge accumulated in the plurality of second photoelectric conversion elements during each of the plurality of the second exposure periods are read by sequentially exposing the plurality of second photoelectric conversion elements for a plurality of second exposure periods having different lengths of time while simultaneously exposing the plurality of first photoelectric conversion elements for the first exposure period, and each of the second exposure periods overlaps with the first exposure period.

With this configuration, it is possible to obtain at least three signals (a first signal and at least two second signals) having different sensitivities. Accordingly, for example, when it is assumed that two second exposure periods are present, it becomes possible to generate an image data having a first dynamic range by combining an image data generated from the first signal with another image data generated from one of the two second signals, and generate an image data having a second dynamic range by combining the image data generated from the first signal with the other of the two second signals. That is, it becomes possible to generate a plurality of image data having different dynamic ranges by image processing after photographing. Therefore, even when photographing is not performed several times, a plurality of image data having different dynamic ranges for the same subject can be obtained. As a result, the convenience of the imaging apparatus can be improved.

An imaging method of the present invention uses a solid state imaging device that includes a plurality of first photoelectric conversion elements and a plurality of second photoelectric conversion elements arranged in a two-dimensional array. The imaging method includes: a driving step of reading-out a first signal according to electrical charges accumulated in the plurality of first photoelectric conversion elements during the first exposure period and a second signal according to electrical charges accumulated in each of the plurality of second photoelectric conversion elements during each of the plurality of second exposure periods by sequentially exposing the plurality of second photoelectric conversion elements for a plurality of second exposure periods having different lengths of time while simultaneously exposing the plurality of first photoelectric conversion elements for the first exposure period, and each of the second exposure periods overlaps with the first exposure period.

Advantageous Effects of Invention

According to the present invention, it is possible to provide an imaging apparatus and an imaging method capable of obtaining a plurality of types of image data having different dynamic ranges in a single photographing.

DESCRIPTION OF EMBODIMENTS

Hereinafter, an embodiment of the present invention will be described with reference to the accompanying drawings.

Figure 1:
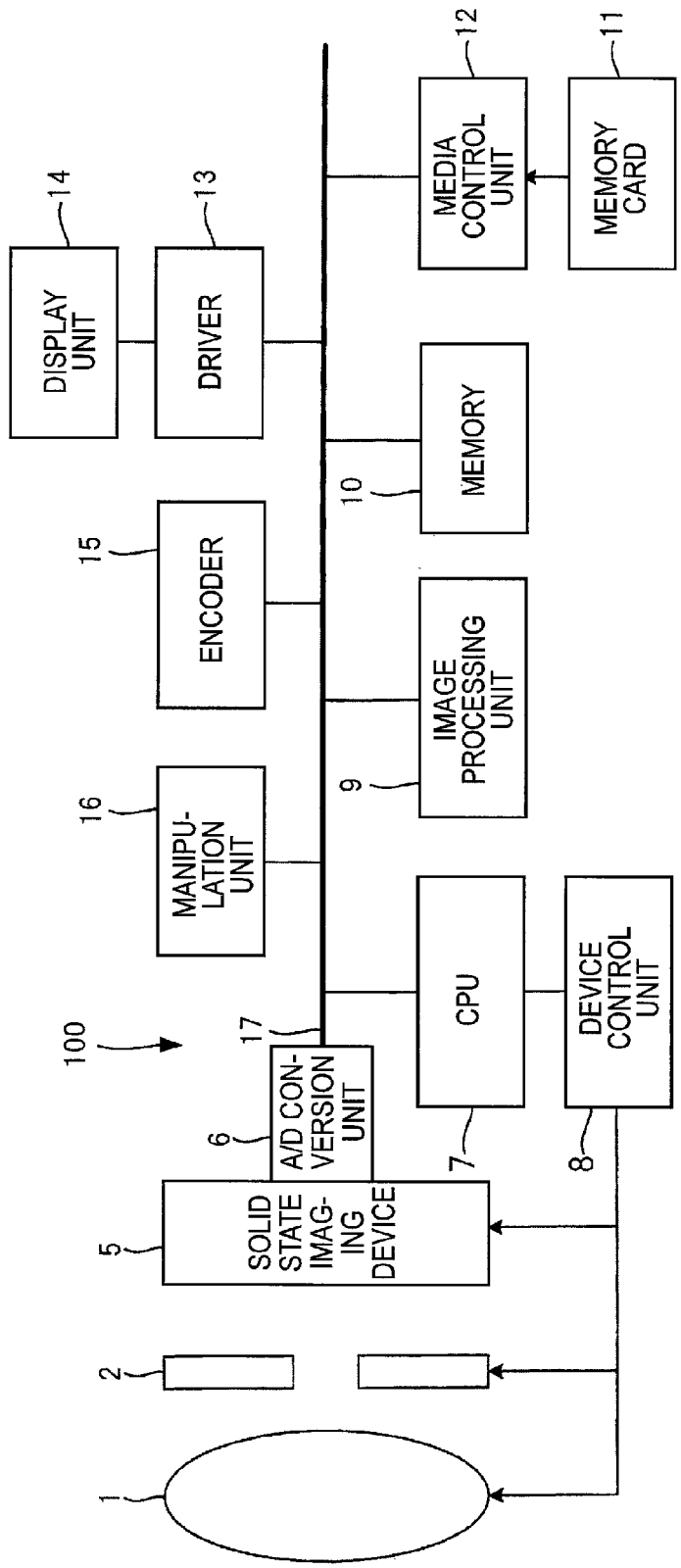
FIG. 1 is a functional block diagram of an imaging apparatus for describing an embodiment of the present invention.

FIG. 1 is a functional block diagram of an imaging apparatus 100 for describing an embodiment of the present invention. The imaging system of the imaging apparatus 100 includes a photographing lens system 1, a diaphragm 2, a solid state imaging device 5, and an analog-to-digital (A/D) conversion unit 6.

The diaphragm 2 is disposed at the rear side of the photographing lens system 1. A photographing optical system is constituted with the photographing lens system 1 and the diaphragm 2.

The solid state imaging device 5 which is a CMOS type solid state imaging device is disposed in the rear side of the diaphragm 2, and details of which will be described later. A captured image signal, which corresponds to an optical image incident on the light receiving surface of the solid state imaging device 5 after passing through the photographing lens system 1 and the diaphragm 2 in this order, is converted into digital data in the A/D conversion unit 6, and then output onto a bus 17.

A central processing unit (CPU) 7 integrally controlling the entire imaging apparatus 100, a manipulation unit 16 constituted with, such as a manipulation button including a shutter release button, an image processing unit 9 constituted with, such as a DSP and performing image processing for the captured image signal based on an instruction from the CPU 7, a video encoder 15 converting captured image data obtained by performing image processing into data for display, a driver 13 displaying the captured image data converted in the video encoder 15 on a display unit 14, a memory 10, and a media control unit 12 are connected to the bus 17. A recording medium (memory card) (11) is detachably mounted on the media control unit 12.

A device control unit 8 is connected to the CPU 7. The device control unit 8 controls the driving of the solid state imaging device 5 according to an instruction from the CPU 7. Further, the device control unit 8 controls an adjustment of an opening size of the diaphragm 2 according to an instruction from the CPU 7. The device control unit 8 controls a focus position or a zoom position of the photographing lens system 1.

Figure 2:
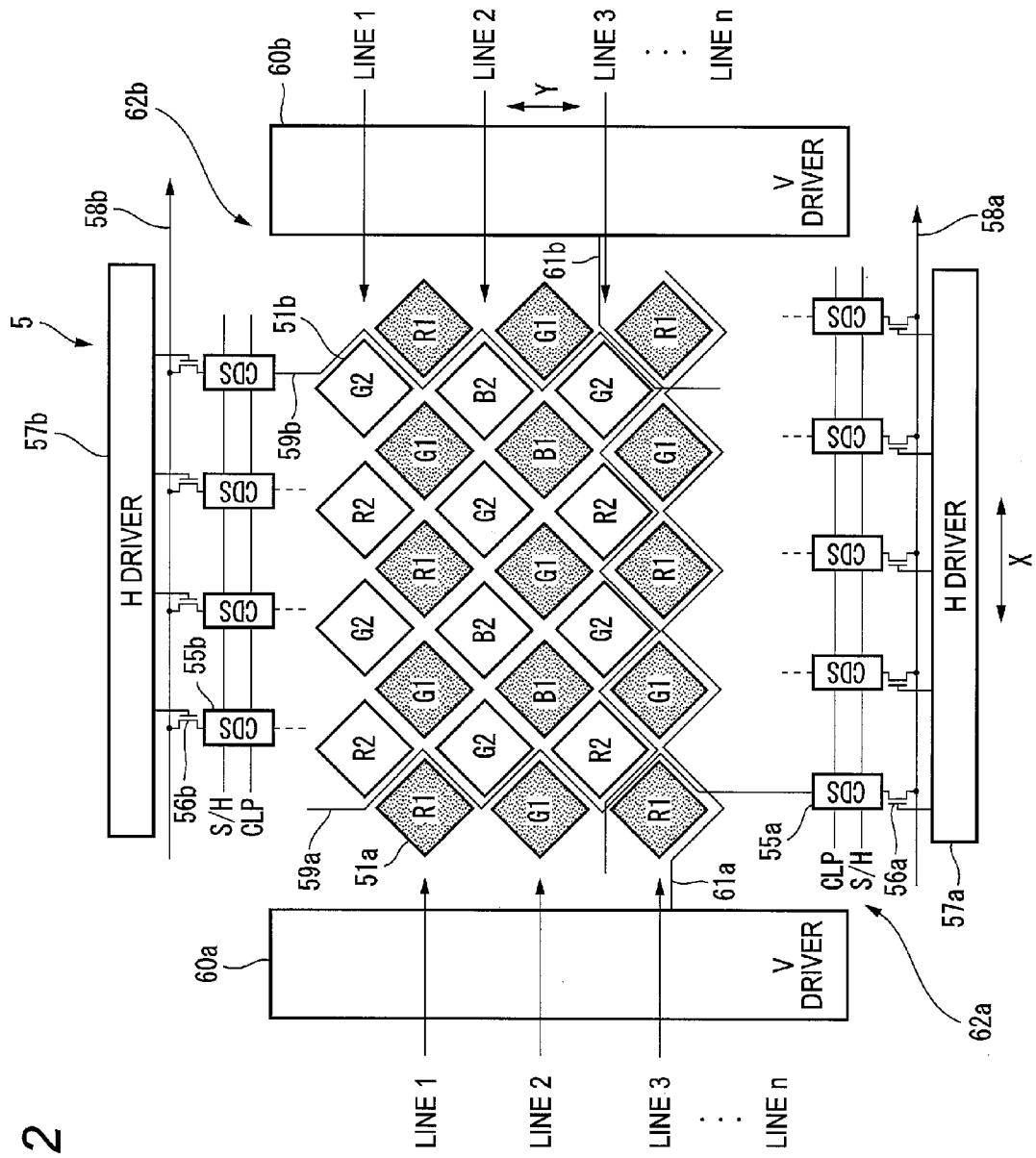
FIG. 2 is a plan view illustrating a schematic configuration of a solid state imaging device 5 in the imaging apparatus illustrated in FIG. 1.

FIG. 2 is a plan view schematically illustrating a configuration of the solid state imaging device 5 in the imaging apparatus 100 illustrated in FIG. 1.

As illustrated in FIG. 2, the solid state imaging device 5 includes a first group made up of a plurality of photoelectric conversion elements 51a (which are hatched), a second group made up of a plurality of photoelectric conversion elements 51b, and a signal read-out circuit 61a installed to correspond to the first group, and a signal read-out circuit 61b installed to correspond to the second group.

All the photoelectric conversion elements included in the solid state imaging device 5 are disposed in a two-dimensional pattern in a column direction Y of a semiconductor substrate surface and a row direction X intersecting the column direction (crossing at right angles in the example of FIG. 2). All the photoelectric conversion elements are arranged in such a manner that first photoelectric conversion element rows made up of the plurality of photoelectric conversion elements 51a arranged in parallel to the row direction X and second photoelectric conversion element rows made up of the plurality of photoelectric conversion elements 51b arranged in parallel to the row direction X are alternately arranged in parallel at a constant pitch in the column direction Y. Furthermore, the first photoelectric conversion element rows are disposed to be shifted relative to the second photoelectric conversion element rows in the row direction X by one half of the array pitch of the photoelectric conversion elements of each photoelectric conversion element line in the row direction X. This array can be obtained by disposing the photoelectric conversion elements 51b at positions offset obliquely in a 45° direction with respect to the respective photoelectric conversion elements 51a disposed in a square lattice pattern.

As such, the photoelectric conversion elements 51b are disposed adjacent to all the photoelectric conversion elements 51a in the same positional relationship. Thus, each photoelectric conversion element 51a and the photoelectric conversion element 51b adjoining the photoelectric conversion element 51a in the same positional relationship (in the same direction) pair up with each other.

All the photoelectric conversion elements included in the solid state imaging device 5 have approximately the same configuration (the same design value). The term "approximately the same configuration" means that sizes of the photoelectric conversion regions (photodiodes) formed within a semiconductor substrate are approximately the same, and that opening sizes of the light-shielding films formed above the photoelectric conversion regions are approximately the same.

Over each of the photoelectric conversion elements 51a, a color filter R1 transmitting red light, a color filter G1 transmitting green light, or a color filter B1 transmitting blue light is installed, in which the color filters R1, R2, R3 are disposed in a Bayer array as a whole.

In FIG. 2, the letter "R1" is given to a photoelectric conversion element 51a over which a color filter R1 is installed. Further, the letter "G1" is given to a photoelectric conversion element 51a over which a color filter G1 is installed. In addition, the letter "B1" is given to a photoelectric conversion element 51a over which a color filter B1 is installed.

Over each of the photoelectric conversion elements 51b, a color filter R2 transmitting red light, a color filter G2 transmitting green light, or a color filter B2 transmitting blue light is installed, in which the color filters R2, G2, B2 are disposed in a Bayer array as a whole.

In FIG. 2, the letter "R2" is given to a photoelectric conversion element 51b over which a color filter R2 is installed. Further, the letter "G2" is given to a photoelectric conversion element 51b over which a color filter G2 is installed. In addition, the letter "B2" is given to a photoelectric conversion element 51b over which a color filter B2 is installed.

In the following description, a color filter R1 and a color filter R2 are also collectively called a red filter; a color filter G1 and a color filter G2 are also collectively called a green filter; and a color filter B1 and a color filter B2 are also collectively called a blue filter.

As such, the same color filters (the red filters, the green filters, or the blue filters) are respectively disposed over the photoelectric conversion elements 51a and the photoelectric conversion elements 51b that are adjacent to each other in the same positional relationship (in the example illustrated in FIG. 2, the photoelectric conversion elements 51a and the photoelectric conversion elements 51b obliquely adjacent thereto in the right upper direction). Accordingly, three types of pairs that are different in color of filter installed atop (R pairs with a red filter installed atop, G pairs with a green filter installed atop, and B pairs with a blue filter installed atop) are included in the solid state imaging device 5.

As illustrated in FIG. 2, the first photoelectric conversion element rows are referred to sequentially as a first line, a second line, a third line, . . . , n-th line from the top in FIG. 2. The second photoelectric conversion element rows are also referred to sequentially as a first line, a second line, a third line, . . . , n-th line from the top in FIG. 2. The respective photoelectric conversion elements 51b, which pair up with the respective photoelectric conversion elements 51a included in the k-th line (k=1, 2, 3, . . . , n) of the first photoelectric conversion element rows, form the k-the line (k=1, 2, 3, . . . , n) of the second photoelectric conversion element rows.

A CMOS circuit, which is not illustrated, is provided correspondingly in the vicinity of each of all the photoelectric conversion elements included in the solid state imaging device 5. The CMOS circuit has, for example, a three-transistor or a four-transistor configuration.

A signal read-out circuit 62a includes CDS circuits 55a, transistors 56a, an H driver 57a, a signal output line 58a, a wiring 59a (only partly illustrated), a V driver 60a, and a wiring 61a (only partly illustrated). The signal read-out circuit 62a is controlled by the device control unit 8 as illustrated in FIG. 1.

The wiring 61a is connected to the CMOS circuits corresponding to the photoelectric conversion element rows constituted with a plurality of the photoelectric conversion elements 51a arranged in parallel to the row direction X. The wiring 61a is connected to the V driver 60a.

The V driver 60a performs a driving to select the photoelectric conversion element rows constituted with a plurality of the photoelectric conversion elements 51a arranged in parallel to the row direction one by one and to read signals to the wiring 59a from the CMOS circuits corresponding to the selected photoelectric conversion element row. Further, the V driver 60a also performs a driving to control the reset transistors of the CMOS circuits corresponding to the photoelectric conversion elements 51a of the first group so as to reset the accumulated electrical charges in the photoelectric conversion elements 51a of the first group (a driving to exhaust the electrical charges of the photoelectric conversion elements to the drains of the reset transistors of the CMOS circuits).

The CDS circuits 55a are installed to correspond to the photoelectric conversion element columns constituted with a plurality of the photoelectric conversion elements 51a arranged in parallel to the column direction Y, respectively. Each of the CDS circuits 55a is connected to the CMOS circuit of the corresponding photoelectric conversion element column through the wiring 59a. The CDS circuits 55a perform a correlated double sampling of an input signal.

The H driver 57a is connected to each of the CDS circuits 55a through a transistor 56a. The H driver 57a turns ON the transistor 56a sequentially to allow signals processed in the CDS circuits 55a to be output to the signal output line 58a.

The signal read-out circuit 62b includes CDS circuits 55b, transistors 56b, an H driver 57b, a signal output line 58b, a wiring 59b (only partly illustrated), a V driver 60b, and a wiring 61b (only partly illustrated). The signal read-out circuit 62b is controlled by the device control unit 8 as illustrated in FIG. 1.

The wiring 61b is connected to the CMOS circuits corresponding to the photoelectric conversion element rows constituted with a plurality of the photoelectric conversion elements 51b arranged in parallel to the row direction X. The wiring 61b is connected to the V driver 60b.

The V driver 60b performs a driving to select the photoelectric conversion element rows constituted with a plurality of the photoelectric conversion elements 51b arranged in parallel to the row direction one by one and to read signals to the wiring 59b from the CMOS circuits corresponding to the selected photoelectric conversion element rows. Further, the V driver 60b also performs a driving to control the reset transistors of the CMOS circuits corresponding to the photoelectric conversion elements 51b of the second group so as to reset the accumulated electrical charges in the photoelectric conversion elements 51b of the second group (a driving to exhaust the electrical charges of the photoelectric conversion elements to the drains of the reset transistors of the CMOS circuits).

The CDS circuits 55b are installed to correspond to the photoelectric conversion element columns constituted with a plurality of the photoelectric conversion elements 51b arranged in parallel to the column direction Y. The CDS circuits 55b are connected to the CMOS circuits of the corresponding photoelectric conversion element columns through the wiring 59b. The CDS circuits 55b perform a correlated double sampling of an input signal.

The H driver 57b is connected to each of the CDS circuits 55b through a transistor 56b. The H driver 57b turns ON the transistors 56b sequentially to allow signals processed in the CDS circuits 55b to be output to the signal output line 58b.

With this configuration, the captured image signal can be read from the first and second groups simultaneously.

Next, a photographing operation of the imaging apparatus 100 illustrated in FIG. 1 will be described.

First, an outline will be described. When a photographing command is issued as the shutter release button is pushed, the device control unit 8 controls the solid state imaging device 5 to sequentially expose the second group of photoelectric conversion elements 51b for a plurality of second exposure periods having different lengths of time during the first exposure period while exposing the first group of photoelectric conversion elements 51a for the first exposure period. When the first exposure period and each of the plurality of second exposure period are ended, the device control unit 8 outputs a captured image signal according to electrical charges accumulated in the photoelectric conversion elements during the exposure periods from the solid state imaging device 5. The image processing unit 9 performs an image processing for at least three kinds of captured image signals (a signal obtained during the first exposure period and signals obtained during the plurality of second exposure periods) to generate at least two kinds of captured image data having different sensitivities.

The image processing unit 9 combines the captured image data corresponding to the first exposure period and each of the plural kinds of captured image data corresponding to the second exposure periods, thereby generating plural kinds of captured image data having different dynamic ranges. The image processing unit 9 records the plural kinds of the captured image data having different dynamic ranges in the memory card 11 and ends the photographing. With this operation, plural kinds of captured image data having different dynamic ranges can be obtained with a single photographing.

Figure 3:
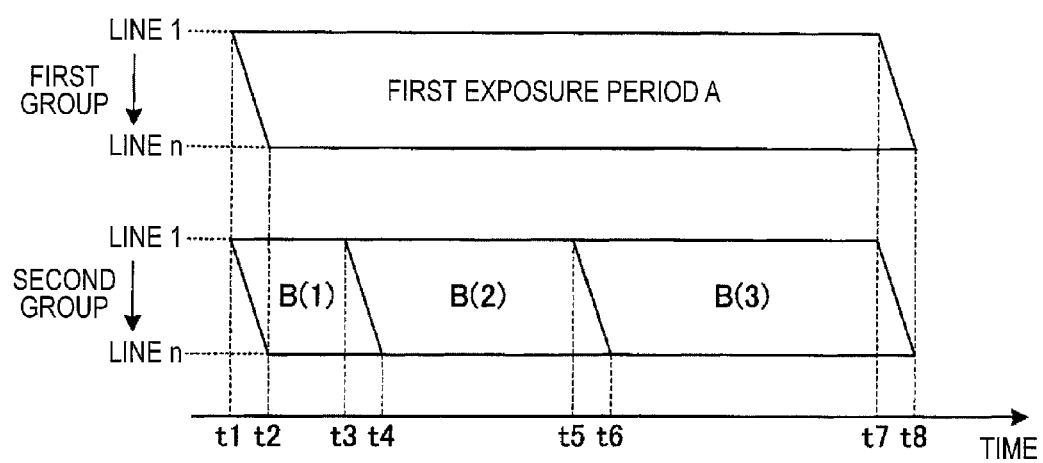
FIG. 3 is a timing chart for describing operations at the time of photographing by the imaging apparatus illustrated in FIG. 1.

FIG. 3 is a timing chart illustrating operations at the time of photographing by the imaging apparatus 100 illustrated in FIG. 1, in which a relationship between exposure periods of the first group of the photoelectric conversion elements 51a and the second group of the photoelectric conversion elements 51b is illustrated in detail. The contents of control by the device control unit 8 will be described in detail with reference to FIG. 3. In FIG. 3, an example in which three second exposure periods are included in the first exposure period is illustrated. In FIG. 3, a rectangular shape (parallelogram) denoted by a "first exposure period A" represents a first exposure period of the entirety of the first group, and each of rectangular shapes (parallelogram) denoted by "B(1)", "B(2)", and "B(3)" represents a second exposure period of the entirety of the second group.

When a photographing command is issued, the device control unit 8 makes the V driver 60a perform a rolling reset driving to reset the accumulated electrical charges of the first group of the photoelectric conversion elements 51a for each line of the photoelectric conversion elements 51a while varying timing. Further, the device control unit 8 makes the V driver 60b perform another rolling reset driving to reset the accumulated electrical charges of the second group of the photoelectric conversion elements 51b for each line of the photoelectric conversion elements 51b while varying timing. The V driver 60a and the V driver 60b reset the accumulated electrical charges by synchronizing the timing of reset in the k-th line of the first group with another timing of reset in the k-th line of the second group.

In the example illustrated in FIG. 3, between time t1 and time t2, the photoelectric conversion elements 51b in each line of the second group are sequentially reset simultaneously when the photoelectric conversion elements 51a in each line of the first group are sequentially reset. In each line of the first group, the exposure of the first exposure period A is started at the time when the resetting of the accumulated electrical charges is ended. In each line of the second group, the exposure of the second exposure period B(1) is started at the time when the resetting of the accumulated electrical charges is ended When a predetermined length of time has elapsed after starting the exposure of the first line of the first group and the first line of the second group at time t1, and it arrives at time t3, the device control unit 8 makes the signal read-out circuit 62b perform a rolling read-out driving in which a signal according to the accumulated electrical charges of the photoelectric conversion elements 51b of the second group is read for each line of the photoelectric conversion elements 51b while varying timing.

In the example illustrated in FIG. 3, the signal according to the accumulated electrical charges of the photoelectric conversion elements 51b of the second group is output from the solid state imaging device 5 between time t3 and time t4. In each line of the second group, the exposure of the second exposure period B(1) is ended when the reading-out of the signal according to the accumulated electrical charges of the photoelectric conversion elements 51b is ended.

In the meantime, the device control unit 8 resets the accumulated electrical charges of the photoelectric conversion elements 51b of each line through the V driver 60b each time the signal reading-out for each line is ended between time t3 and time t4, and after the resetting is ended, the device control unit 8 reads-out the signal of the next line. That is, the rolling read-out driving and the rolling reset driving are alternately performed between time t3 and time t4. In each line of the second group, the exposure of the second exposure period B(2) is started at the time when the resetting by the rolling reset driving between time t3 and time t4 is ended.

When a predetermined length of time, which is longer than the second exposure period B(1), has elapsed after starting the exposure of the second exposure period B(2), and it arrives at time t5, the device control unit 8 makes the signal read-out circuit 62b alternately perform the rolling read-out driving and the rolling reset driving.

In the example illustrated in FIG. 3, between time t5 and time t6, a signal according to the accumulated electrical charges of the photoelectric conversion elements 51b of each line of the second group is output from the solid state imaging device 5 and the accumulated electrical charges of the photoelectric conversion elements 51b of each line of the second group are reset. In each line of the second group, the exposure of the second exposure period B(2) is ended at the time when the reading-out of the signal according to the accumulated electrical charges of the photoelectric conversion elements 51b is ended, and the exposure of the second exposure period B(3) is started at the time when the resetting of the accumulated electrical charges is ended.

When a predetermined length of time, which is longer than the second exposure period B(2), has elapsed after starting the exposure of the second exposure period B(3) and it becomes time t7, the device control unit 8 makes the signal read-out circuit 62b alternately perform the rolling read-out driving and the rolling reset driving.

In the example illustrated in FIG. 3, between time t7 and time t8, a signal according to the accumulated electrical charges of the photoelectric conversion elements 51b of each line of the second group is output from the solid state imaging device 5 and the accumulated electrical charges of the photoelectric conversion elements 51b of each line of the second group are reset. In each line of the second group, the exposure of the second exposure period B(3) is ended at the time when the reading-out of the signal according to the accumulated electrical charges of the photoelectric conversion elements 51b is ended.

When it arrives at time t7, the device control unit 8 makes the signal read-out circuit 62a alternately perform the rolling read-out driving to read the signal according to the accumulated electrical charges of the photoelectric conversion elements 51*a* of the first group, and the rolling reset driving while varying timing.

In the example illustrated in FIG. 3, between time t7 and time t8, a signal according to the accumulated electrical charges of the photoelectric conversion elements 51*a* of each line of the first group is output from the solid state imaging device 5 and the accumulated electrical charges of the photoelectric conversion elements 51*a* of each line of the first group are reset. In each line of the first group, the exposure of the first exposure period A is ended at the time when the reading-out of the signal according to the accumulated electrical charges of the photoelectric conversion elements 51*a* is ended. Between time t7 and time t8, the V driver 60*a* and the V driver 60*b* read signals according to the accumulated electrical charges of the photoelectric conversion elements by synchronizing the signal read-out timings in the k-th line of the first group and in the k-th line of the second group.

With the above-described drivings, the exposures of the second exposure period B(1), the second exposure period B(2) and the second exposure period B(3) are sequentially performed during the exposure of the first exposure period A such that four kinds of the captured image signals obtained from the exposures for the four exposure periods can be output from the solid state imaging device 5. After photographing, the image processing unit 9 combines the captured image data corresponding to the first exposure period A and the captured image data corresponding to the second exposure period B(1) to generate a captured image data having a first dynamic range. Further, the image processing unit 9 combines the captured image data corresponding to the first exposure period A and the captured image data corresponding to the second exposure period B(2) to generate a captured image data having a second dynamic range. Still further, the image processing unit 9 combines the captured image data corresponding to the first exposure period A and the captured image data corresponding to the second exposure period B(3) to generate a captured image data having a third dynamic range. In this manner, three kinds of captured image data having different dynamic ranges can be simply obtained. Accordingly, a user of the imaging apparatus 100 can obtain desired captured image data by varying the dynamic ranges after performing a photographing, thereby reducing pothgraphing failure chances.

Figure 4:
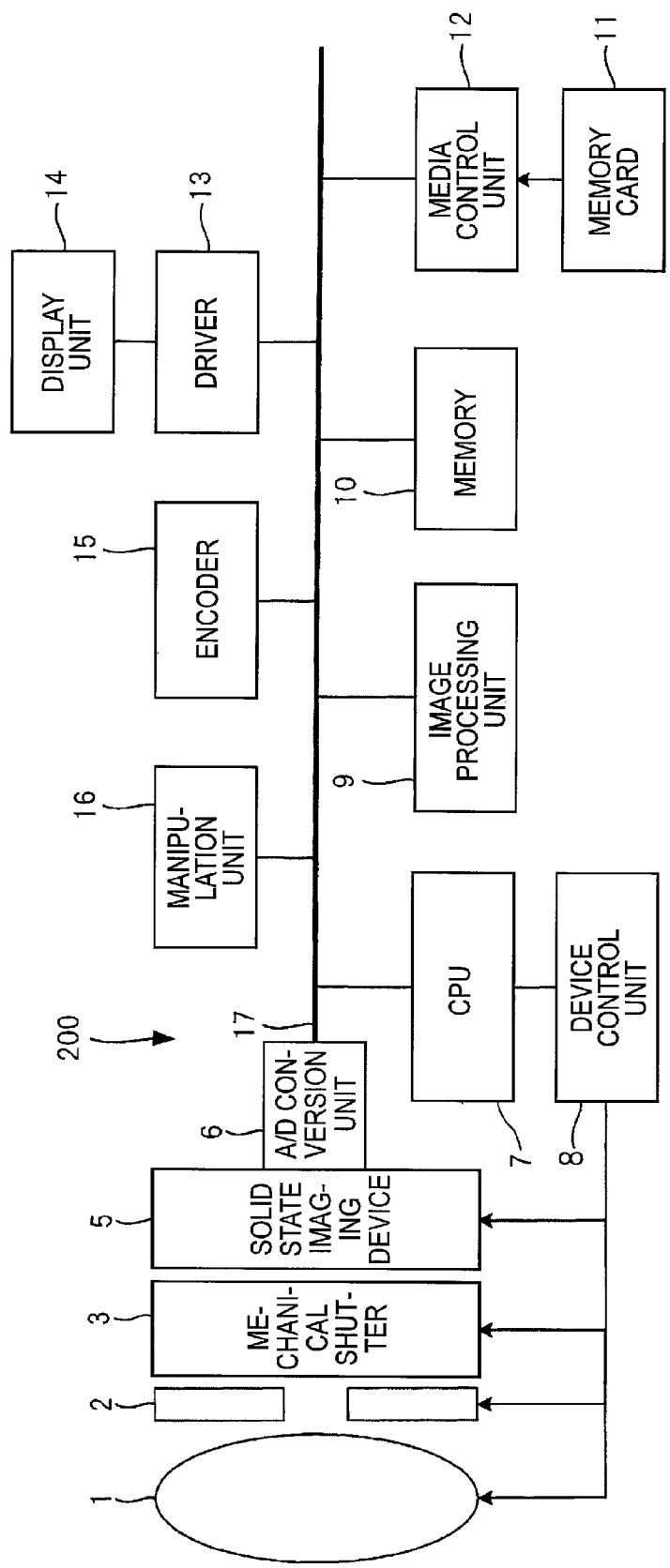
FIG. 4 is a view illustrating a modified embodiment of the imaging apparatus illustrated in FIG. 1.

FIG. 4 is a view illustrating a modified embodiment of the imaging apparatus 100 illustrated in FIG. 1.

An imaging apparatus 200 illustrated in FIG. 4 has the same configuration as that of the imaging apparatus 100 illustrated in FIG. 1 except that a mechanical shutter 3 is additionally provided in the light incident side of the solid state imaging device 5 (between the diaphragm 2 and the solid state imaging device 5 in the example of FIG. 4).

A photographing operation of the imaging apparatus 200 illustrated in FIG. 4 is different from that of the imaging apparatus 100 illustrated in FIG. 1. Hereinafter, the photographing operation of the imaging apparatus 200 will be described.

Figure 5:
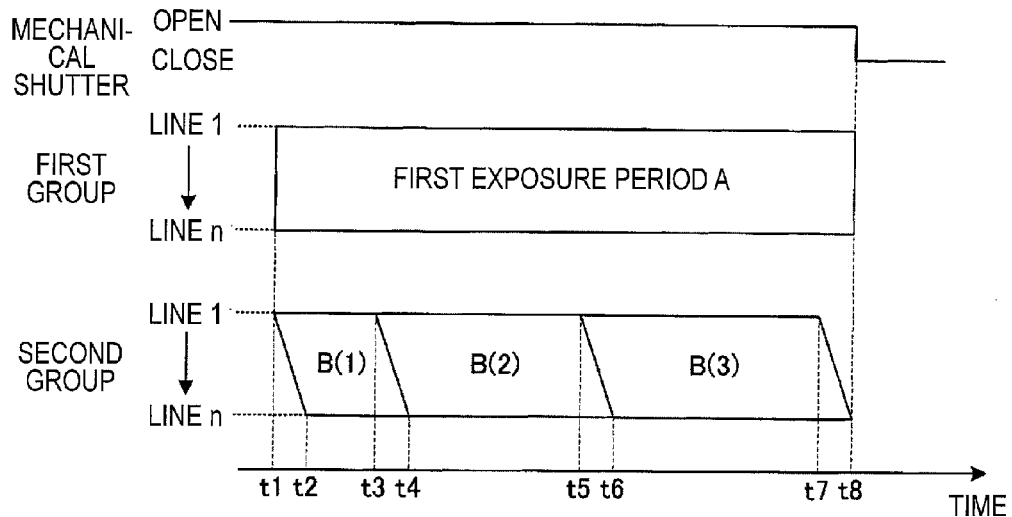
FIG. 5 is a timing chart for describing operations at the time of photographing by the imaging apparatus illustrated in FIG. 4.

FIG. 5 illustrates a timing chart for describing operations at the time of photographing by the imaging apparatus 200. The timing chart illustrated in FIG. 5 is substantially different from that illustrated in FIG. 3 in that the first exposure period A is started by performing a global reset driving to simultaneously reset the accumulated electrical charges of all the photoelectric conversion elements 51*a* of the first group, and in that the exposure of the first exposure period A is ended by performing a driving to close the mechanical shutter 3.

When a photographing command is issued while the mechanical shutter 3 is in an open state, the device control unit 8 makes the V driver 60*a* perform the global reset driving to simultaneously reset of the electrical charges of all the photoelectric conversion elements 51*a* of the first group. In the first group, the exposure of the first exposure period A is started at the time when the global reset is ended. In the meantime, as illustrated in FIG. 3, the electrical charges accumulated in each line of the second group are sequentially reset according to the photographing command, and the exposure of the second exposure period B(1) is started at the time when the resetting is ended. Because the operations from the starting of the exposure of the second exposure period B(1) to the end of the second exposure period B(2) the same as those described in FIG. 3, description thereof will be omitted.

When a predetermined length of time, which is longer than the second exposure period B(2), has elapsed after starting the exposure of the second exposure B(3), and it arrives at time t7, the device control unit 8 makes the signal read-out circuit 62*b* alternately perform the rolling read-out driving and the rolling reset driving. In the example illustrated in FIG. 5, between time t7 and time t8, a signal according to the accumulated electrical charges of the photoelectric conversion elements 51*b* of each line of the second group is output from the solid state imaging device 5 and the accumulated electrical charges of the photoelectric conversion elements 51*b* of each line of the second group is reset. In each line of the second group, the exposure of the second exposure period B(3) is ended at the time when the reading-out of signal according to the accumulated electrical charges of the photoelectric conversion elements 51*b* is ended.

When it arrives at time t8 at which the reading-out of the signal of the n-th line of the second group is ended, the device control unit 8 makes the mechanical shutter 3 be in closed state. The exposure of the first exposure period A is ended at the time when the mechanical shutter 3 is closed. After the exposure of the first exposure period A is ended, the device control unit 8 reads out the captured image signal from the first group by the rolling read-out driving.

As described above, it is possible to coincidently start and end timings of exposure for all the lines of the first group by using the mechanical shutter 3 according to the imaging apparatus 200. Therefore, it is possible to remove distortions that occur on a moving subject specific to the CMOS sensor for the captured image data obtained from the first group.

Figure 6:
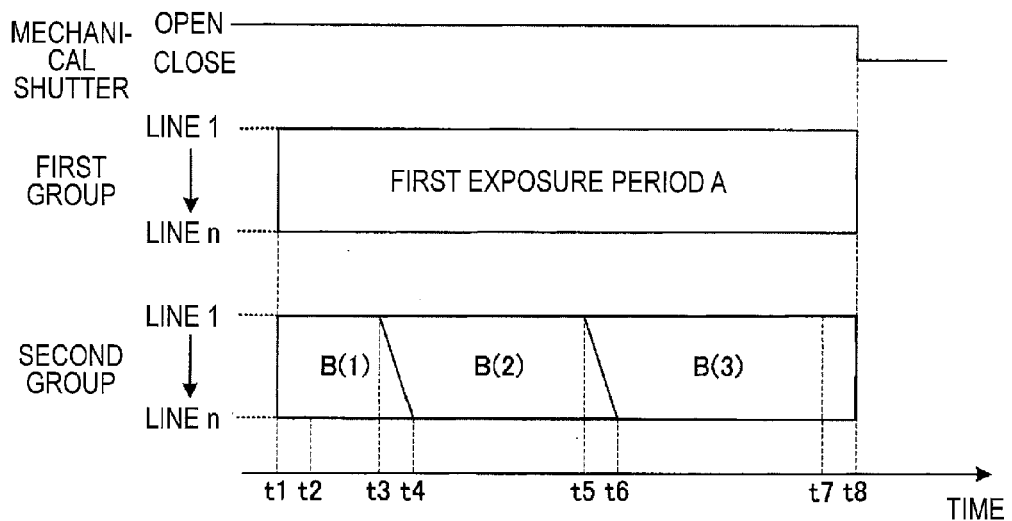
FIG. 6 is a timing chart for describing other operations at the time of photographing by the imaging apparatus illustrated in FIG. 4.

In the meantime, in the imaging apparatus 200, it may be possible that the global reset driving which simultaneously reset the accumulated elecatrical charges of all the photoelectric conversion elements 51*b* of the second group is performed to start the exposure of the second exposure period B(1). Furthermore, the exposure of the second exposure period B(3) may be ended by closing the mechanical shutter 3. FIG. 6 illustrates a timing chart in such a case where the mechanical shutter is closed.

Even when photographing is performed in accordance with timings indicated in a timing chart illustrated in FIG. 6, a plurality of the captured image data having different dynamic ranges can be obtained. However, in the driving method illustrated in FIG. 6, all the lines of the second group are not allowed to be exposed for an uniform exposure period during the second exposure period B(1) and second exposure period B(3). In contrast, in the driving method illustrated in FIG. 5, all the lines of the second group are allowed to be exposed for the uniform exposure period during any one of the second exposure period B(1), the second exposure period B(2) and second exposure period B(3). Therefore, it is possible to improve quality of the plurality of captured image data obtained from the second group.

Figure 7:
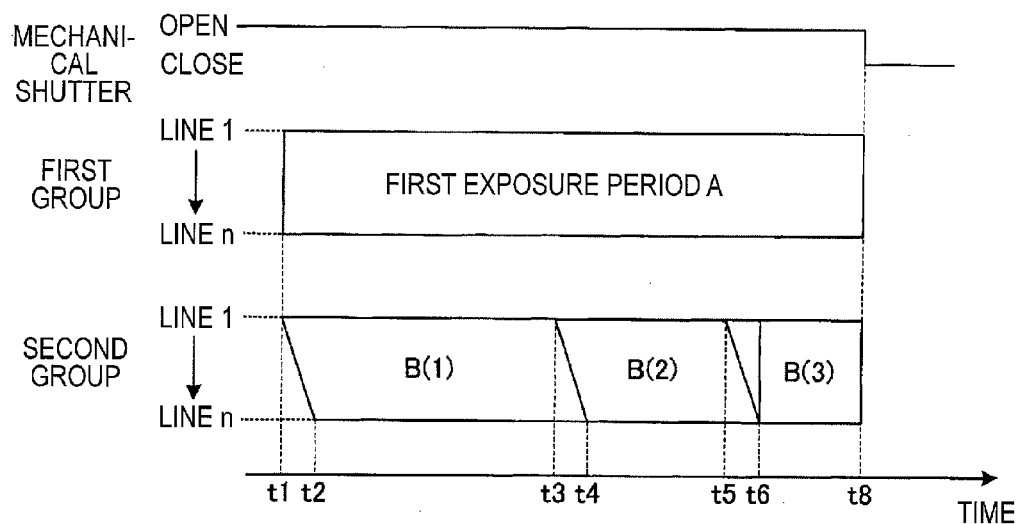
FIG. 7 is a timing chart illustrating a modified embodiment of a driving method illustrated in FIG. 5.

FIG. 7 is a timing chart illustrating a modified embodiment of the driving method illustrated in FIG. 5. The timing chart illustrated in FIG. 7 is the same as that illustrated in FIG. 5 except that the second exposure period B(3), which is the last second exposure period of the plurality of second exposure periods, is started by performing the global reset driving and is ended by closing the mechanical shutter 3, and the length of the second exposure period becomes shorter with the order of the second exposure period B(1), the second exposure period B(2) and the second exposure period B(3).

In the timing chart illustrated in FIG. 7, the operations performed at time t1 to time t6 are the same as those illustrated in FIG. 5. At time t6, when the reading-out of the signal according to the accumulated electrical charges of the photoelectric conversion elements 51b of the n-th line is ended, the device control unit 8 makes the V driver 60b perform a global reset driving which simultaneously reset all the photoelectric conversion elements 51b. The second exposure period B(3) is started from the time of the resetting of the accumulated electrical charges of photoelectric conversion elements 51b.

When a predetermined length of time, which is shorter than the second exposure period B(2), has elapsed after starting the exposure of the second exposure B(3), and it arrives at time t8, the device control unit 8 drives the mechanical shutter 3 to be closed. The first exposure period A and the second exposure period B(3) are ended from the time when the mechanical shutter 3 is closed. After the first exposure period A is ended, the device control unit 8 performs a rolling read-out driving to read the captured image signals from the first group and the second group, respectively.

As described above, according to the driving method illustrated in FIG. 7, start timing and end timing of the last second exposure period among the plurality of second exposure periods can be coincident with each other for all the lines of the second group. Therefore, image distortion cannot occurred in the captured image data obtained during the second exposure period B(3), so that image quality can be improved.

In the meantime, image distortion for a moving object becomes prominent in a case where the exposure period is short. For this reason, the shortest time period (an exposure period having the highest image distortion occurrence) is arranged to the location of the last exposure period B(3) illustrated in FIG. 7. By doing this, the image degradation can be suppressed as small as possible when photographing a moving object.

In the example of FIG. 7, an expiration timing of the last exposure period B(3) is controlled by the mechanical shutter 3. However, there is a temporal variation in the timing of closing the mechanical shutter 3. For this reason, the lower limit for which the last exposure period B(3) can be shortened is determined by temporal variation of the mechanical shutter 3. Therefore, in order to realize much shorter exposure period, it is preferable to set an exposure period, except for the last exposure period among the plurality of the second exposure periods of which start timing and end timing can be controlled by electrical driving, to the shortest exposure period.

The most preferable case is that an exposure period except for the first and last exposure periods among the plurality of exposure periods is set to the shortest exposure period.

Figure 8:
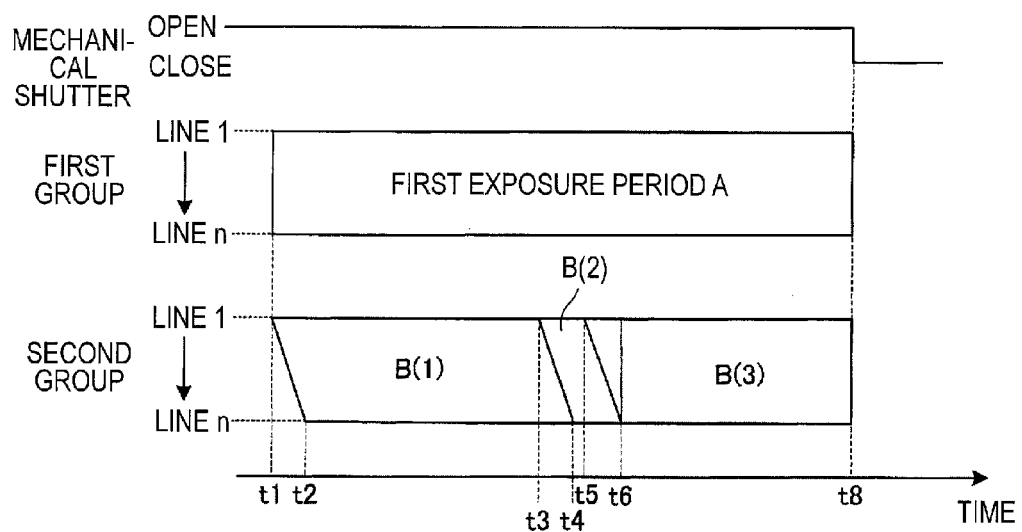
FIG. 8 is a view illustrating a case where an exposure period B(2) is set to the shortest period in the timing chart illustrated in FIG. 7.

For example, as illustrated in FIG. 8, the most preferable case corresponds to a case where the exposure period B(2) is set to the shortest exposure period in the timing chart illustrated in FIG. 7. When an exposure period is extremely short, it becomes identical to a case where photographing is performed with a high-speed shutter. For this reason, image distortion specific to the CMOS sensor becomes difficult to occur even when the subject is moving. Further, when photographing a moving subject, the captured image data from the first group becomes an image corresponding to an average of images subjected to photographing at the start timing and end timing of the first exposure period A. Therefore, as illustrated in FIG. 8, the exposure period B(2) is arranged in the vicinity of the central portion of the first exposure period A, so that correlation between the captured image data obtained during the first exposure period A and that obtained during the exposure period B(2) can be increased. For this reason, it is particularly preferable to set an exposure period, except for the first and the last exposure periods among the plurality of exposure periods, to the shortest exposure period. It is further preferable that a timing corresponding to half of the first exposure period A is coincident with another timing corresponding to half of the shortest exposure period.

In the description so far, the signal read-out circuit 62a and the signal read-out circuit 62b are installed separately in the first group and the second group, respectively, but it may be configured as a general MOS sensor by integrating the signal read-out circuit into a single signal read-out circuit.

However, when single signal read-out circuit is installed, the k-th lines of the first group and the second group cannot be synchronously driven. For this reason, for example, in order to realize the driving method illustrated in FIG. 3, it is needed that a rolling reset driving for starting the second exposure period B(1) is performed after a rolling reset driving for starting the first exposure period A is ended, and a rolling read-out driving for ending the second exposure period B(3) is performed after a rolling read-out driving for ending the first exposure period A is ended, as illustrated in FIG. 9.

Figure 10:
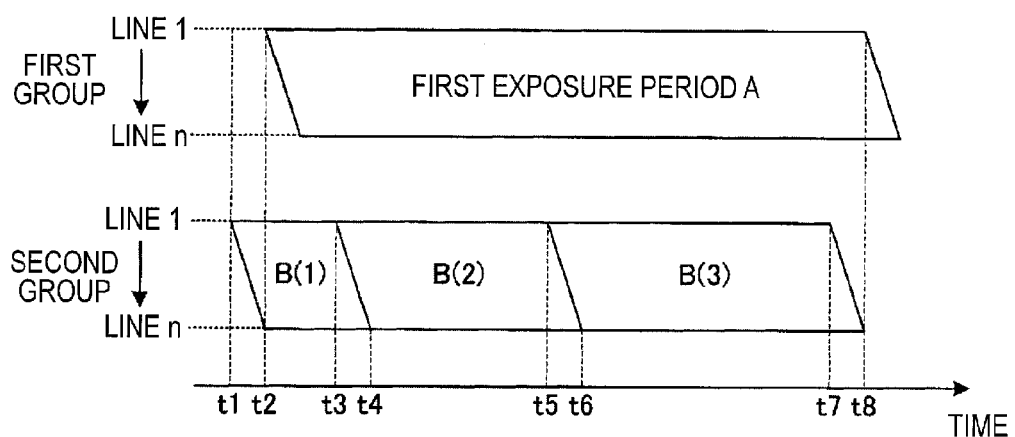
FIG. 10 is a view illustrating another example of a timing chart for implementing the driving method illustrated in FIG. 3 with a single signal read-out circuit.

Otherwise, as illustrated in FIG. 10, it is needed that a rolling reset driving for starting the first exposure period A is performed after a rolling reset driving for starting the second exposure period B(1) is ended, and a rolling read-out driving for ending the first exposure period A is performed after a rolling read-out driving for ending the second exposure period B(3) is ended.

Figure 9:
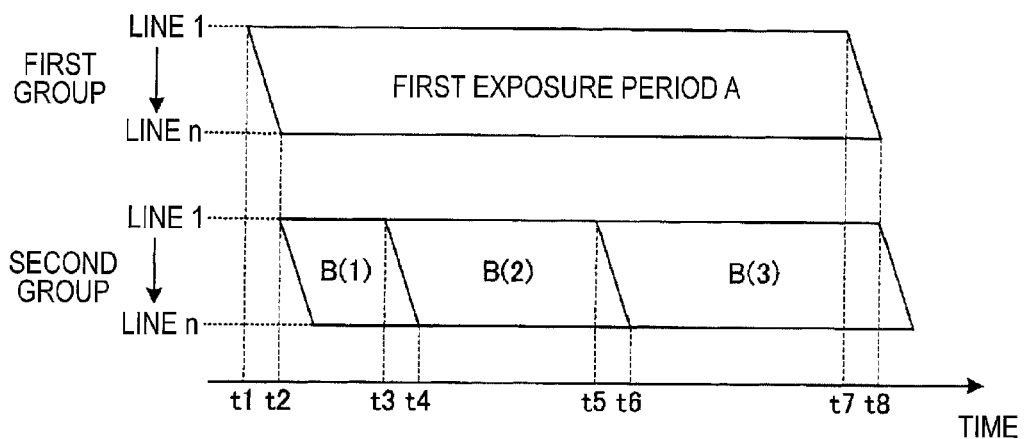
FIG. 9 is a view illustrating an example of a timing chart for implementing the driving method illustrated in FIG. 3 with a single signal read-out circuit.

Even in the driving methods illustrated in FIGS. 9 and 10, the first exposure period A overlaps with each of the second exposure period B(1), the second exposure period B(2) and the second exposure period B(3). For this reason, a correlation between the captured image signal obtained during the first exposure period and the captured image signal obtained during each of the second exposure period B(1), the second exposure period B(2) and the second exposure period B(3) becomes sufficiently high. Therefore, there is no effect on the qualities of the plural kinds of the captured image signals having different dynamic ranges. Specifically, only a part of the first or the last exposure period among the plurality of exposure periods overlaps with the first exposure period A. However, every part of other second exposure periods overlaps with the first exposure period A. For this reason, the effect on the quality of the plural kinds of the captured image data due to the overlap is small. As illustrated in FIG. 2, in a configuration in which two signal read-out circuits are installed, the exposure for the entirety of the plurality of the second exposure periods can be performed during exposure of the first exposure period. Therefore, a high image quality of the captured image data can be achieved.

The arrangement of the photoelectric conversion elements of the solid state imaging device 5 illustrated in FIG. 2 may be modified as follows.

Figure 11:
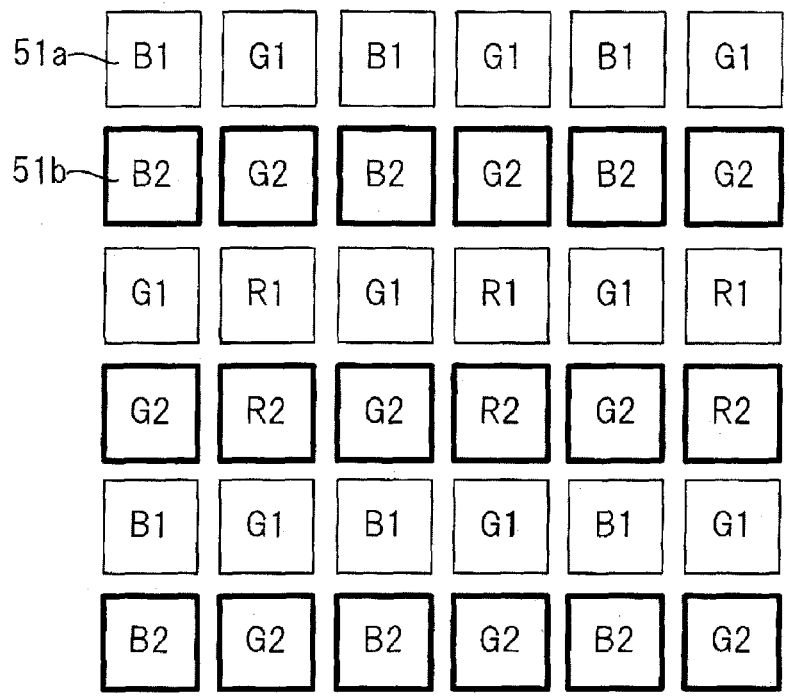
FIG. 11 is a view illustrating a modified embodiment of the solid state imaging device illustrated in FIG. 2.

FIG. 11 is a view illustrating a modified embodiment of the solid state imaging device illustrated in FIG. 2. The solid state imaging device of the modified embodiment is configured such that the plurality of the photoelectric conversion elements are arranged in a square lattice pattern in which photoelectric conversion elements 51a are arranged in odd-numbered rows and photoelectric conversion elements 51b are arranged in even-numbered rows.

Figure 12:
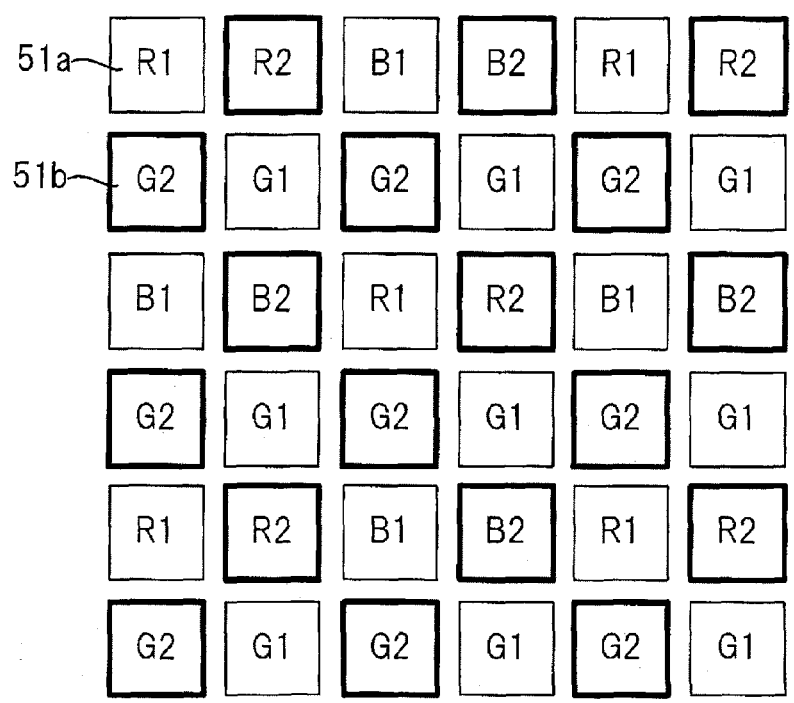
FIG. 12 is a view illustrating another modified embodiment of the solid state imaging device illustrated in FIG. 2.

FIG. 12 is a view illustrating another modified embodiment of the solid state imaging device illustrated in FIG. 2. The solid state imaging device of the modified embodiment is configured such that the plurality of the photoelectric conversion elements are arranged in a square lattice pattern in which photoelectric conversion elements 51a are arranged in checkered pattern positions and photoelectric conversion elements 51b are arranged in other checkered pattern positions.

Even in the arrangements illustrated in FIGS. 11 and 12, a color image data having a widened dynamic range by combining a pixel data corresponding to the respective photoelectric conversion element 51a of the first group and the a pixel data corresponding to the respective photoelectric conversion elements 51b that forms a pair with the photoelectric conversion element 51a.

In the meantime, the photoelectric conversion elements 51a and the photoelectric conversion elements 51b are configured the same configuration such that the difference in sensitivity is absent, but it may be configured such that the difference in sensitivity is present. In this case, the time ratio of the first exposure period and each of the plurality of the second exposure periods may be determined in consideration of the difference in sensitivity of the photoelectric conversion elements 51a and the photoelectric conversion elements 51b.

In the description as described above, the solid state imaging device 5 is a CMOS type solid state imaging device, but may be a CCD type solid state imaging device.

Figure 13:
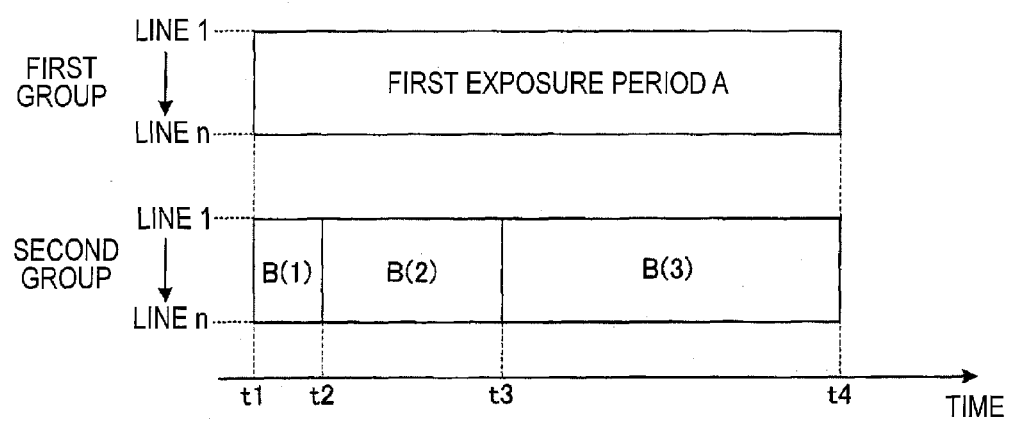
FIG. 13 is a timing chart for describing operations at the time of photographing when the solid state imaging device in the image apparatus illustrated in FIG. 1 is a CCD type solid state imaging device.

FIG. 13 is a timing chart for describing operations at the time of photographing by the imaging apparatus when the solid state imaging device 5 of the image apparatus 100 illustrated in FIG. 1 is a CCD type solid state imaging device, and corresponds to FIG. 3.

In a case where the solid state imaging device 5 is a CMOS type solid state imaging device, when a photographing command is issued, the device control unit 8 turns OFF the electronic shutter pulse (time t1). By doing this, the photoelectric conversion elements 51a of the first group and the photoelectric conversion elements 51b of the second group goes in a state in which electrical charges can be accumulated. In all the lines of the first group, the exposure of the first exposure period A is started and in each line of the second group, the exposure of the second exposure period B is started.

When a predetermined length of time has elapsed from time t1, and it arrives at time t2, the device control unit 8 reads-out the electrical charges accumulated on the photoelectric conversion elements 51b of the second group onto vertical CCDs and transfers the read-out electrical charges to the amplifier to allow a signal according to the accumulated electrical charges to be output from the amplifier. In all the lines of the second group, the exposure of the second exposure period B(1) is ended and the exposure of the second exposure period B(2) is started simultaneously at the time when reading-out of the accumulated electrical charges onto the vertical CCDs is ended.

When a predetermined length of time, which is longer than the second exposure period B(1), has elapsed after starting the exposure of the second exposure B(2), and it arrives at time t3, the device control unit 8 reads-out the electrical charges accumulated on the photoelectric conversion elements 51b of the second group onto vertical CCDs and transfers the read-out electrical charges to the amplifier to allow a signal according to the accumulated electrical charges to be output from the amplifier. In all the lines of the second group, the exposure of the second exposure period B(2) is ended and the exposure of the second exposure period B(3) is started simultaneously at the time when reading-out of the accumulated electrical charges onto the vertical CCDs is ended.

When a predetermined length of time, which is longer than the second exposure period B(2), has elapsed after starting the exposure of the second exposure B(3), and it arrives at time t4, the device control unit 8 reads-out the electrical charges accumulated on the photoelectric conversion elements 51b of the second group onto vertical CCDs and transfers the read-out electrical charges to the amplifier to allow a signal according to the accumulated electrical charges to be output from the amplifier. In all the lines of the second group, the exposure of the second exposure period B(3) is ended at the time when reading-out of the accumulated electrical charges onto the vertical CCDs is ended.

At the time t4, the device control unit 8 reads-out the electrical charges accumulated on the photoelectric conversion elements 51b of the second group onto vertical CCDs and transfers the read-out electrical charges to the amplifier to allow signal according to the accumulated electrical charges to be output from the amplifier. In all the lines of the first group, the exposure of the first exposure period A is ended at the time when reading-out of the accumulated electrical charges onto the vertical CCDs is ended.

With such a driving as described above, the CCD type solid state imaging device can also acquire the plural kinds of captured image data having different dynamic ranges in a single photographing. In the CCD type solid state imaging device, it is possible to coincidently start and end timings of exposure for all the lines of any of the first group and second group. Accordingly, it is possible to obtain the captured image data without image distortion even for a moving subject.

In a case where the solid state imaging device 5 is made of a CCD type solid state imaging device, exposure periods except for the first exposure period of the plurality of the second exposure periods are needed to be longer than a signal read-out period during which the electrical charges accumulated on the photoelectric conversion elements 51b of the second group are read onto vertical CCDs and the read-out electrical charges are transferred to allow a signal according to the accumulated electrical charges to be output from the solid state imaging device 5. For example, this is because when the length of the second exposure period B(2) is shorther than that of the signal read-out period, the electrical charges accumulated during the second exposure period B(2) are transferred to the vertical CCDs before the signal read-out which began at t2 is ended to make it difficult to read signal.

In the meantime, there is no above-described time limitation on the first of the plurality of the second exposure periods. For example, the electrical charges generated during an exposure period other than the second exposure period B(1) are not present in the vertical CCDs at a start time t1 of the second exposure period B(1) illustrated in FIG. 13. Therefore, it does not matter to make the second exposure period B(1) to shorten as much as possible.

Therefore, when the solid state imaging device 5 is a CCD type solid state imaging device, it is desired to make a first exposure period of the plurality of the second exposure periods to be a shortest time period.

As described above, the following matters are disclosed in the present specification.

The above-described imaging apparatus includes: a solid state imaging device that includes a plurality of first photoelectric conversion elements and a plurality of second photoelectric conversion elements arranged in a two-dimensional array; and a driving unit that performs a driving in which a first signal according to electrical charges accumulated in the plurality of first photoelectric conversion elements during the first exposure period and a second signal according to electrical charges accumulated in the plurality of second photoelectric conversion elements during each of the plurality of the second exposure periods are read by sequentially exposing the plurality of second photoelectric conversion elements for a plurality of second exposure periods having different lengths of time while simultaneously exposing the plurality of first photoelectric conversion elements for the first exposure period, and each of the second exposure periods overlaps with the first exposure period.

The imaging apparatus further includes a mechanical shutter positioned in light incident side of the solid state imaging device, and the solid state imaging device is a CCD type solid state imaging device. The driving unit performs the global reset driving in which the accumulated electrical charges of the plurality of the first photoelectric conversion elements is simultaneously reset to make the first exposure period A start, closes the mechanical shutter to make the first exposure period end after starting the first exposure period A and performs a rolling reset driving in which the accumulated electrical charges of the plurality of the second photoelectric conversion elements is reset for each line of the second photoelectric conversion elements while varying timing to make exposure periods except for at least last exposure period of the plurality of exposure periods start.

The driving unit of the imaging apparatus performs the global reset driving in which the accumulated electrical charges of the plurality of the second photoelectric conversion elements is simultaneously reset to make last exposure period of the plurality of second exposure periods start and closes the mechanical shutter to make last exposure period of the plurality of second exposure periods end.

In the imaging apparatus, last exposure period of the plurality of the second exposure periods is set to the shortest period among the plurality of second exposure periods.

In the imaging apparatus, the shortest period among the plurality of second exposure periods corresponds to a period except for first and last exposure periods of the plurality of the second exposure periods.

In the imaging apparatus, the number of the second exposure periods is three.

The driving unit of the imaging apparatus performs the rolling reset driving to make the respective second exposure periods start and performs a rolling read-out driving in which the second signal is read for each line of the second photoelectric conversion elements while varying timing to make the respective second exposure periods end.

In the imaging apparatus, the solid state imaging device is a CMOS type solid state imaging device. The driving unit performs a rolling reset driving in which the accumulated electrical charges of the plurality of first photoelectric conversion element is reset for each line of the first photoelectric conversion elements while varying timing to make the first exposure period start, performs a rolling reset driving in which the accumulated electrical charges of the plurality of second photoelectric conversion element is reset for each line of the second photoelectric conversion elements while varying timing to make the respective second exposure periods start, performs a rolling read-out driving in which the first signal is read for each line of the first photoelectric conversion elements while varying timing to make the first exposure period end, and performs a rolling read-out driving in which the second signal is read for each line of the second photo-electric conversion elements while varying timing to make the respective second exposure periods end.

In the imaging apparatus, an exposure for the respective second exposure periods is performed during the first exposure period.

In the imaging apparatus, the solid state imaging device is a CCD type solid state imaging device, and first of the plurality of the second exposure periods is the shortest exposure period.

In the imaging apparatus, the solid state imaging device includes a first signal read-out circuit for reading-out the first signal from the plurality of the first photoelectric conversion elements and a second signal read-out circuit installed separately from the first signal read-out circuit and for reading-out the second signal from the plurality of the second photoelectric conversion elements.

The above-described imaging method using a solid state imaging device that includes a plurality of first photoelectric conversion elements and a plurality of second photoelectric conversion elements arranged in a two-dimensional array, and a driving unit, the imaging method includes: a driving step of reading-out a first signal according to electrical charges accumulated in the plurality of first photoelectric conversion elements during the first exposure period and a second signal according to electrical charge accumulated in each of the plurality of second photoelectric conversion elements during each of the plurality of second exposure periods by sequentially exposing the plurality of second photoelectric conversion elements for a plurality of second exposure periods having different lengths of time while simultaneously exposing the plurality of first photoelectric conversion elements for the first exposure period, and each of the second exposure periods overlaps with the first exposure period.

In the imaging method, the solid state imaging device is a CCD type solid state imaging device, in the driving step, the global reset driving in which the accumulated electrical charges of the plurality of the first photoelectric conversion elements is simultaneously reset is performed to make the first exposure period A start, the mechanical shutter installed at light incident side of the solid state imaging device is closed to make the first exposure period end after starting the first exposure period, and a rolling reset driving in which the accumulated electrical charges of the plurality of the second photoelectric conversion elements is reset for each line of the second photoelectric conversion elements while varying timing is performed to make exposure periods except for at least last exposure period of the plurality of exposure periods start.

In the driving step of the imaging method, the global reset driving in which the accumulated electrical charges of the plurality of the second photoelectric conversion elements is simultaneously reset is performed to make the last exposure period of the plurality of second exposure periods start and the mechanical shutter is closed to make last exposure period of the plurality of second exposure periods end.

In the imaging method, the last exposure period of the plurality of the second exposure periods is set to the shortest period among the second exposure periods.

In the imaging method, the shortest period among the plurality of second exposure periods corresponds to a period except for first and last exposure periods of the plurality of the second exposure periods.

In the imaging method, the number of the second exposure periods is three.

In the imaging method, in the driving step, the rolling reset driving is performed to make the respective second exposure periods start and performs a rolling read-out driving in which the second signal is read for each line of the second photoelectric conversion elements while varying timing is performed to make the respective second exposure periods end.

In the imaging method, the solid state imaging device is a CMOS type solid state imaging device, and in the driving step, a rolling reset driving in which the accumulated electrical charges of the plurality of the first photoelectric conversion element is reset for each line of the first photoelectric conversion elements while varying timing is performed to make the first exposure period start, a rolling reset driving in which the accumulated electrical charges of the plurality of the second photoelectric conversion element is reset for each line of the second photoelectric conversion elements while varying timing is performed to make the respective second exposure periods start, a rolling read-out driving in which the first signal is read for each line of the first photoelectric conversion elements while varying timing is performed to make the first exposure period end, and a rolling read-out driving in which the second signal is read for each line of the second photoelectric conversion elements while varying timing is performed to make the respective second exposure periods end.

In the imaging method, an exposure for the respective second exposure periods is performed during the first exposure period.

In the imaging method, the solid state imaging device is a CCD type solid state imaging device, and first of the plurality of the second exposure periods is set to the shortest exposure period.

In the imaging method, in the driving step, the first signal is read using a first signal read-out circuit and a second signal is read using the second signal read-out circuits installed separately from the first signal read-out.

INDUSTRIAL APPLICABILITY

According to the present invention, it is possible to provide an imaging apparatus and an imaging method capable of obtaining plural kinds of image data having different dynamic ranges in a single photographing.

Although the present invention is described with reference to the detailed and specific embodiments, it is apparent to those skilled in the art that various changes or modified embodiments may be practiced without departing from the spirit and scope of the present invention.

The present application is based on Japanese Patent Application (Patent Application No. 2010-169799) filed on Jul. 28, 2010, the disclosure of which is incorporated herein by reference in its entirety.

REFERENCE SIGNS LIST

100: imaging apparatus,
5: solid state imaging device
8: device control unit
51a, 51b: photoelectric conversion elements
62a, 62b: signal read-out circuits
10: Imaging device driving unit

The invention claimed is:

1. An imaging apparatus, comprising:
a CCD type solid state imaging device that includes a plurality of first photoelectric conversion elements and a plurality of second photoelectric conversion elements arranged in a two-dimensional array;
a mechanical shutter positioned in a light incident side of the solid state imaging device; and
a driving unit that performs a driving in which a first signal according to electrical charges accumulated in the plurality of first photoelectric conversion elements during a first exposure period and a second signal according to electrical charges accumulated in the plurality of second photoelectric conversion elements during each of a plurality of second exposure periods are read by sequentially exposing the plurality of second photoelectric conversion elements for the plurality of the second exposure periods having different lengths of time while simultaneously exposing the plurality of first photoelectric conversion elements for the first exposure period,
wherein each of the second exposure periods overlaps with the first exposure period,
and, the driving unit performs a global reset driving to make the first exposure period start, closes the mechanical shutter to make the first exposure period end after starting the first exposure period, and performs a rolling reset driving to make exposure periods, except for at least a last exposure period of the plurality of the second exposure periods, start,
in the global reset driving, the accumulated electrical charges of the plurality of the first photoelectric conversion elements are simultaneously reset, and
in the rolling reset driving, the accumulated electrical charges of the plurality of the second photoelectric conversion elements is sequentially reset for each line of the second photoelectric conversion elements,
wherein the driving unit performs the global reset driving such that the accumulated electrical charges of the plurality of the second photoelectric conversion elements is simultaneously reset to make the last exposure period of the plurality of second exposure periods start and closes the mechanical shutter to make the last exposure period of the plurality of second exposure periods end,
wherein the last exposure period of the plurality of the second exposure periods is a shortest period among the plurality of second exposure periods.

2. The imaging apparatus of claim 1, wherein the second exposure periods are formed of three periods.

3. The imaging apparatus of claim 1, wherein the driving unit performs the rolling reset driving to make the respective second exposure periods start and performs a rolling read-out driving in which the second signal is sequentially read for each line of the second photoelectric conversion elements to make the respective second exposure periods end.

4. The imaging apparatus of claim 1, wherein the solid state imaging device includes a first signal read-out circuit for reading-out the first signal from the plurality of the first photoelectric conversion elements and a second signal read-out circuit installed separately from the first signal read-out circuit for reading-out the second signal from the plurality of the second photoelectric conversion elements.

5. An imaging method using a CCD type solid state imaging device that includes a plurality of first photoelectric conversion elements and a plurality of second photoelectric conversion elements arranged in a two dimensional array, the imaging method comprising:
a driving step of reading-out a first signal according to electrical charges accumulated in the plurality of first photoelectric conversion elements during a first exposure period and a second signal according to electrical charge accumulated in each of the plurality of second photoelectric conversion elements during each of a plurality of second exposure periods by sequentially exposing the plurality of second photoelectric conversion elements for the plurality of second exposure periods having different lengths of time while simultaneously exposing the plurality of first photoelectric conversion elements for the first exposure period, wherein each of the second exposure periods overlaps with the first exposure period, and in the driving step, a global reset driving is performed to make the first exposure period start, a mechanical shutter installed at a light incident side of the solid state imaging device is closed to make the first exposure period end after starting the first exposure period, and a rolling reset driving to make exposure periods, except for at least a last exposure period of the plurality of the second exposure periods, start, in the global reset driving, the accumulated electrical charges of the plurality of the first photoelectric conversion elements is simultaneously reset, and in the rolling reset driving, the accumulated electrical charges of the plurality of the second photoelectric conversion elements is sequentially reset for each line of the second photoelectric conversion elements, wherein in the driving step, the global reset driving is performed such that the accumulated electrical charges of the plurality of the second photoelectric conversion elements is simultaneously reset to make the last exposure period of the plurality of second exposure periods start and the mechanical shutter is closed to make the last exposure period of the plurality of second exposure periods end, wherein the last exposure period of the plurality of the second exposure periods is a shortest period among the second exposure periods.

6. The imaging method of claim 5, wherein the second exposure periods are formed of three periods.

7. The imaging method of claim 5, wherein in the driving step, the rolling reset driving is performed to make the respective second exposure periods start and a rolling read-out driving in which the second signal is sequentially read for each line of the second photoelectric conversion elements to make the respective second exposure periods end.

8. The imaging apparatus of claim 5, wherein in the driving step, the first signal is read using a first signal read-out circuit and the second signal is read using a second signal read-out circuits-installed individually.

* * * * *